July 4, 1967 D. M. MATTOX 3,329,601
APPARATUS FOR COATING A CATHODICALLY BIASED SUBSTRATE
FROM PLASMA OF IONIZED COATING MATERIAL
Filed Sept. 30, 1966 2 Sheets-Sheet 1

INVENTOR.
Donald M. Mattox
BY

Attorney

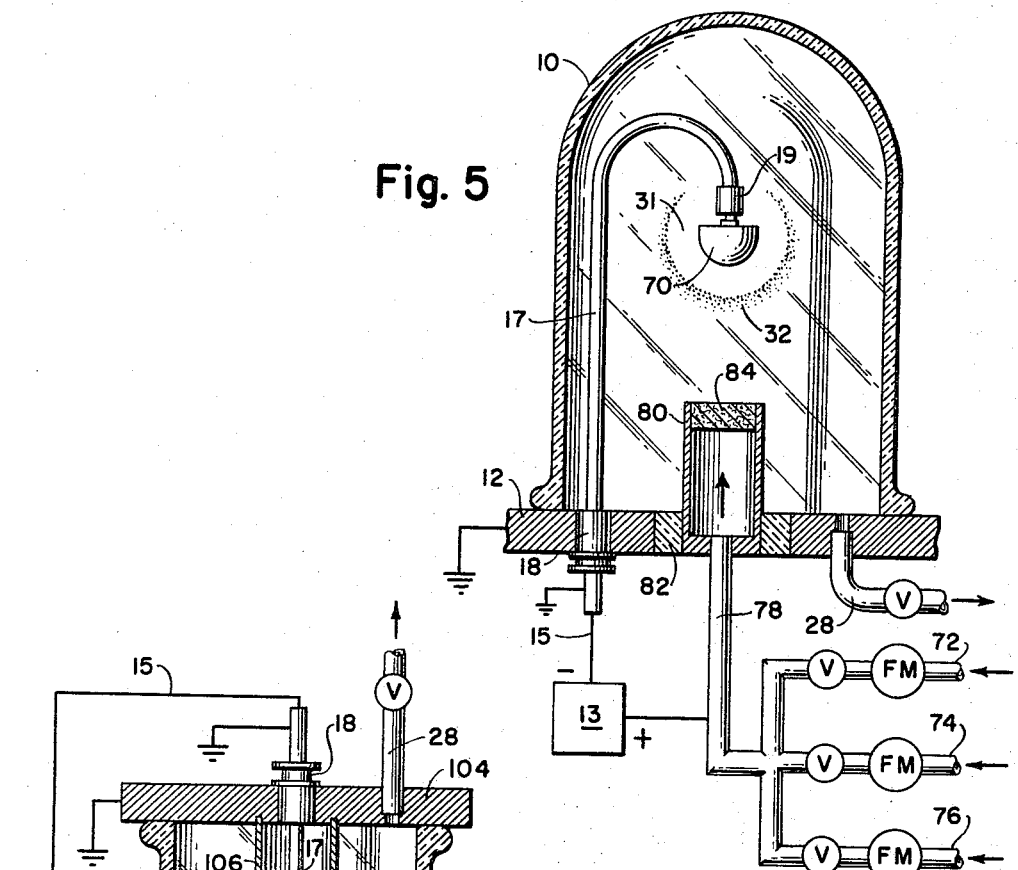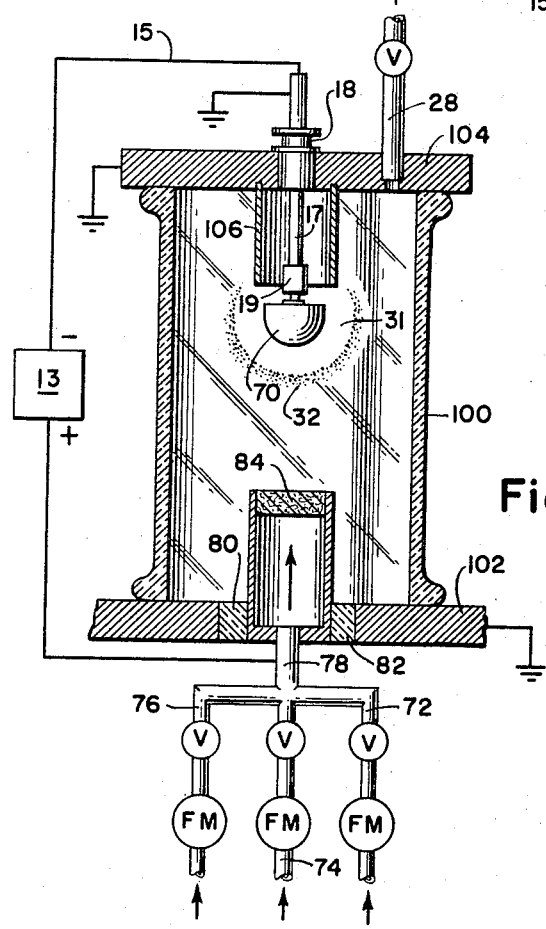

United States Patent Office 3,329,601
Patented July 4, 1967

3,329,601
APPARATUS FOR COATING A CATHODICALLY BIASED SUBSTRATE FROM PLASMA OF IONIZED COATING MATERIAL
Donald M. Mattox, Albuquerque, N. Mex., assignor to the United States of America as represented by the United States Atomic Energy Commission
Filed Sept. 30, 1966, Ser. No. 589,162
8 Claims. (Cl. 204—298)

This application is a continuation-in-part of application S.N. 396,784, filed Sept. 15, 1964, now abandoned.

This invention is related generally to deposition of thin adherent metallizing layers and coatings on various types of substrates. The invention is particularly concerned with a method and apparatus for accomplishing such deposition which depends fundamentally for its operation upon the kinetic energies imparted to ionized particles within a gas discharge. It comprehends not only thin deposition on metallic substrates but also on various types of semiconductors and insulators.

It has long been noted that the adhesion of many film-substrate couples formed by sputtering is greater than that attained by vacuum evaporation techniques, electrodeposition, or vapor plating. While the reasons for this have heretofore been not well understood, microscopic studies and investigations leading to the present invention indicate that the higher kinetic energy of the depositing sputtered atoms affects the substrate surface in such a manner as to result in increased bonding across the film-substrate interface. The mechanism by which atoms of higher kinetic energy improve the bonding across the interface appears to involve surface heating, surface cleaning or the removal of barrier layers such as oxides and other contaminants, and the production of defects or irregularities in the surface. Unfortunately, these effects take place only to a limited degree with sputtered atoms. It follows logically that the adherence properties of film-substrate couples should be greatly enhanced by increasing the average energy of the impinging particles.

The average kinetic energy of evaporated atoms is on the order of a few tenths of an electron volt while the average kinetic energy of sputtered atoms under typical conditions is on the order of 5 electron volts with a maximum on the order of 150 electron volts. A sputtered atom achieves its kinetic energy through a transfer of momentum to a particle dislodged from a cathode as a result of impact by gas atoms and gas ions and is thereafter deposited on a positively charged or uncharged substrate elsewhere in the system. Such particles will be either uncharged or positively charged and will experience no acceleration toward the substrate due to the existing electric field. By constrast, the kinetic energy of positively ionized particles accelerated toward a cathode within a gas discharge is directly proportional to the strength of the electric field and under typical conditions may exceed by a factor of 50 the energy available with sputtered atoms. If particles of such energy can be directly employed in the film deposition process, the advantage is obvious.

It is therefore a general object of this invention to provide a technique for accomplishing highly adherent thin film deposition through the use of high kinetic energy ionized particles.

One very serious problem in the art of thin film deposition has been that of cleaning the substrate surface and keeping it clean until the atoms of the film material are deposited. As long as any appreciable lag occurs between these two steps it is impossible to prevent contamination from occurring in the interim. Any method which reduces this time factor will clearly be an improvement. If it can be effectively eliminated, the advantage is even greater.

It is therefore a further object of this invention to devise a method and apparatus for thin film deposition whereby the separate functions of cleaning and film deposition may be accomplished with virtually no time separation.

Despite its superiority to lower energy deposition systems, the sputtering process is inherently inefficient in that under bombardment by glow discharge, a cathode from which atoms are to be sputtered yields relatively few such atoms for a given flux of gas particles impinging on the surface. In the sputtering process one might expect to increase the supply of sputtered atoms per unit of time by employing greater accelerating potentials. However, a limiting factor here is the rise in temperature of the surface cathode which may actually melt, at which point obviously the entire process fails. Hence sputtering is able to deposit only a few thousand angstroms of film per hour and is thus impractical for industrial use in formation of protective coatings.

Another object of this invention is thus to provide means for accomplishing thin film deposition at comparatively high deposition rates.

A further disadvantage of sputtering and of all other prior art techniques for thin film deposition is their total inability to form film-substrate couples between materials being essentially insoluble, by which is meant a solubility factor of less than 0.1%. It can be shown that such insoluble couples deposited by prior art plating techniques have failed to pass the least rigorous test of adhesion, namely, the so-called "tape test" consisting of applying a piece of adhesive tape to the film and ripping it off. If the adhesion is poor, the film adheres to the tape rather than to the substrate.

It is a further object of this invention to devise improved means for thin film deposition particularly adaptable to the development of adherent insoluble film-substrate couples.

Briefly stated, the technique and apparatus to be described hereinafter consists of making the substrate to be coated part of the cathode of a D-C high voltage circuit, establishing a gas discharge within an evacuated chamber using preferably an inert gas and evaporating the metal to be deposited into the positive glow region of the gas discharge. The substrate surface may be exposed to the gas discharge prior to or during the evaporation and is cleaned and modified by ionized particles of the gas discharge. A portion of the atoms to be deposited is also ionized in the gas discharge and accelerated to the substrate surface adding to the flux of high energy inert gas ions together with uncharged metal atoms of thermal energy. This ion bombardment confines the energy flux to the substrate surface giving high surface temperatures without the need of bulk heating. The combination of cleaning and high energy flux to the substrate surface during deposition provides an environment conducive to the deposition of an adherent metallic film.

FIGS. 5 and 6 show apparatus for utilizing a gaseous depositant.

Figure 2:
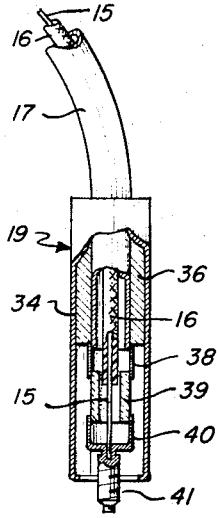
FIG. 2 is a detail of the high voltage feedthrough used to supply the cathode potential.

A typical apparatus by means of which the method of this invention may be practiced includes bell jar 10 which rests on conductive base plate 12. From a high voltage supply 13, high voltage lead 15 covered by insulation 16 and grounded metallic tubing 17 (see FIG. 2) is introduced within bell jar 10 through sliding vacuum seal 18. Tubing 17 terminates within bell jar 10 in high voltage feedthrough 19 to which is connected conductive substrate holder assembly 20 which supports substrate 21 (see FIGURE 3). From filament supply 22, which, like high voltage supply 13, has a floating output, insulated filament leads 23 are connected to copper bus bars 25 which are introduced through base plate 12 with appropriate insulation 27. Connected between the inner ends of bus bar 25 is exposed filament 26 which is adapted to hold or support the metal or other material to be evaporated in the practice of the process of this invention. Bell jar 10 may be evacuated by means of exhaust conduit 28 connected to any convenient source of vacuum. Through gas supply conduit 30 any desired pressure of inert or reactive gas may be introduced within bell jar 10 and in the presence of a high potential (generally about 1000 volts or more) between the interior electrodes, consisting of substrate 21 and filament 26, forms a glow discharge. If substrate 21 is nonmetallic, substrate holder assembly 20 becomes the negative electrode. Such discharge will be characterized by cathode dark space 31 in the vicinity of substrate 21 and positive glow region 32 surrounding cathode dark space 31. It is well understood that an electron leaving the cathode of a gas discharge tube with a given accelerating potential will travel some average distance before it collides with and ionizes a gas molecule. As the gas pressure increases, the number of gas molecules increaess correspondingly and the average distance before collision decreases. This distance, generally referred to as the width of the cathode dark space, determines the beginning of the region of positive glow within the gas. It may be calculated by methods well known to those versed in the art of gas discharge devices. If the cathode is closer to the anode than this average distance, electrons reach the anode before they have traveled the width of the cathode dark space and no region of positive glow is established. It is important therefore to appreciate that the spacing between substrate 21 and filament 26 must be greater than the width of cathode dark space 31 (which itself is inversely proportional to the particular gas pressure used) in order to establish a positive glow region 32. For example, for argon, at the lowest pressure at which a self-sustaining gas discharge can be effected, the pressure is approximately 10 microns and a cathode to anode spacing of 15 centimeters is adequate to establish a gas discharge. Contrariwise for helium the lowest pressure at which a gas discharge can be sustained is of the order of 100 microns and the cathode to anode spacing may be much less.

In FIG. 2 high voltage feedthrough 19 is viewed in greater detail. It consists of an outer metallic ground shield 34 separated from high voltage lead tubing 17 by a metallic guide 36. Within shield 34 tubing 17 is seen to terminate at an intermediate point where it may be fastened, as by brazing, to ring 38. Ring 38 may in turn be appropriately secured to ceramic insulator 39 which is intended to isolate the high voltage supply from ground. Finally, insulator 39 may be secured to terminal 40, which may have a threaded stud portion 41 projecting beyond the end of shield 34. Shield 34 serves two functions, namely, to prevent the occurrence of a glow discharge between terminal 40 and ground and to isolate insulator 39 from evaporated atoms within the system which could destroy its high voltage insulating properties. Finally, high voltage lead 15 may be soldered or embedded within terminal 40. Ground shield 34 should be at a radial distance from high voltage lead 15 less than the width of a cathode dark space for the particular gas pressure being employed. This will prevent the establishment of further glow discharge between these elements which could result in the deposition of a conductive layer on insulator 39 sufficient to short terminal 40 to ground through tubing 17. Experimentation shows that for the configuration shown, filament 26 tends to stabilize in potential a few volts above ground. Since shield 34 through its connection to tubing 17 is at ground potential, the potential difference between shield 34 and terminal 40 (and thus also high voltage lead 15) is substantially the same as between substrate 21 and filament 26. Therefore, for purposes of positioning shield 34, the width of a cathode dark space may be considered the same as for positioning substrate 21 and filament 26.

Figure 3:
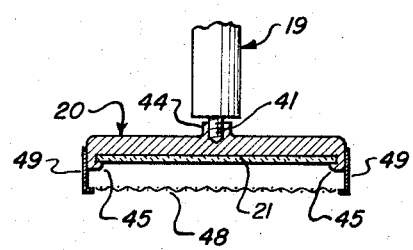
FIG. 3 is a detail of the substrate and holder.

Also seen in detail as connected to high voltage feed through 19 is substrate holder assembly 20 in FIG. 3. Tapped collar 44 is adapted to receive threaded stud portion 41 thereby making good electrical contact. The opposite side of assembly 20 is provided with a pair of inwardly directed parallel flanges 45 which are adapted to receive and support a slidably introduced substrate 21 which may be metallic, semiconductive or of nonconductive properties. The spacing of ground shield 34 from substrate holder assembly 20 is important since shield 34 will float at some potential with respect to substrate 21. It is necessary, therefore, that shield 34 be positioned far enough away from substrate 21 so the effect of the potential of shield 34 is not felt by the ions impinging on substrate 21; otherwise, shield 34 will shadow portions of substrate 21 from ion bombardment. A good design will have no portion of ground shield 34 within a cathode dark space distance of substrate 21 for the particular gas pressure employed. If substrate 21 is nonconductive, optional grid 48 consisting of a fine mesh screening may be introduced in front of substrate 21 and supported by any convenient support means 49 affixed to assembly 20.

Figure 1:
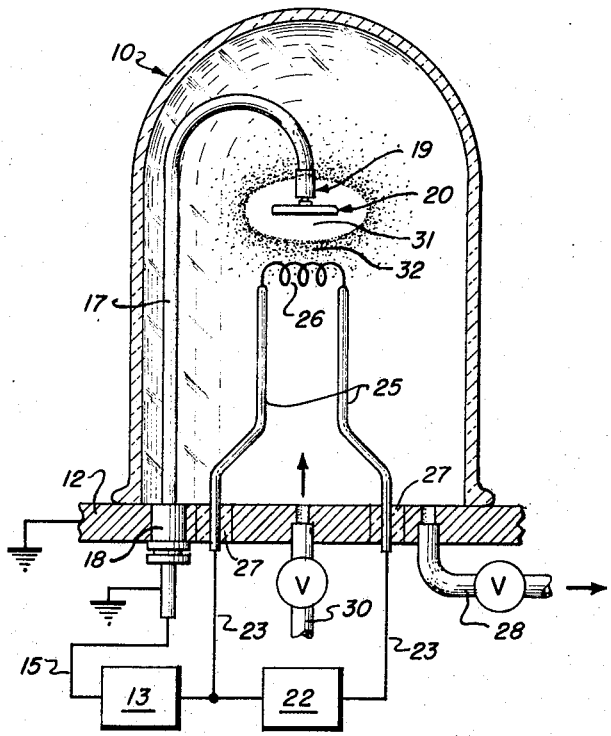
FIG. 1 depicts a typical arrangement for accomplishing the technique of this invention.
Figure 4:
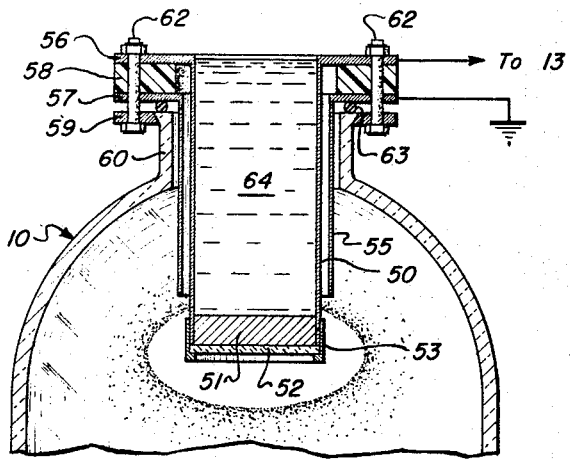
FIG. 4 is a detail of a cryogenic version of the apparatus of FIG. 1.

A modified form of the apparatus of FIG. 1 adapted to meet special cooling requirements is shown in FIG. 4. Through an opening provided in the top of bell jar 10 a suitable metallic cylindrical cold finger 50 is introduced terminating in heat sink 51 consisting, for example, of a copper disk. As shown in FIG. 4, cold finger 50 may conveniently be left open at the top or sealed off with any suitable stopper. Slidably engaged with heat sink 51 is the combination of a cylindrical or disk shaped substrate 52 and cylindrical support means 53.

Cold finger 50 is surrounded by guard ring 55 which is closely adjacent thereto for grounding purposes, preferably less than a cathode dark space distance. External to bell jar 10 cold finger 50 is provided with flange 56 and guard ring 55 is provided with a like flange 57, said flanges being separated by an insulating disk 58. Below flange 57 is positioned pressure ring 59 which is adapted to bear inwardly against a bevelled surface of glass pipe 60 integral with the top portion of bell jar 10. When a plurality of nylon bolts 62 spaced radially about cold finger 50 are tightened, pressure ring 59, through glass pipe 60, exerts pressure on "O" ring seal 63 by means of which suitable vacuum may be maintained within bell jar 10. Depending upon the particular requirements covering the deposition of a thin film using the apparatus of FIG. 4 a suitable liquid 64, for example, ice water or liquid nitrogen, may be introduced within cold finger 50.

In operation the method of this invention consists in selecting the substrate 21 and inserting it within assembly 20. The material to be deposited may be wound about or supported by filament 26. The material may be in the form of a winding, a coating, or in some other appropriate form. After bell jar 10 is evacuated, some type of gas, for example, argon, will be backfilled into bell jar 10 to a gas pressure dependent upon the desired current density. After a glow discharge 32 is established within bell jar 10 the surface of substrate 21 will be bombarded with positive ionized particles of gas. The energies of these particles will be so great that very effective surface cleaning will be accomplished, including removal of oxides and contaminants. In addition and very importantly, the surface of substrate 21 will be modified and its temperature will be raised. Atoms of the surface of substrate 21 will be displaced and its surface will become highly defected. In other words, the movement of atoms of substrate 21 from their normal lattice position by collision with impinging ions having energy greater than about 25 electron volts creates vacancies which can be filled by substitutional atoms of impinging material. The ability of the gas ions to alter the interfacial region is crucial to the success of the method of this invention. The mechanism by which undesirable particles are removed from the surface of substrate 21 is, of course, one of sputtering, but it should be carefully noted that the mechanism whereby atoms of film material are deposited is not that of sputtering.

After surface cleaning and modification has persisted for a period of time dependent upon the nature of the particular substrate 21 which might typically vary from a few minutes up to one-half hour, evaporation of the film material from its supportive position on filament 26 is begun by heating the filament from power supply 22. As atoms of the film material enter glow discharge region 32 they become positively ionized in part due to electron bombardment and in part due to the loss of electrons to positive gas ions. The positively ionized atoms of film material are then accelerated to the surface of substrate 21. There, in cooperation with other ionized atoms of the glow discharge, they will be able to continue the cleaning of the surface of substrate 21 by sputtering action. The high kinetic energy film particles are also able to penetrate appreciable distances, that is, many lattice spacings, into the substrate lattice. They are also enabled to occupy the many nucleation sites created by the initial gas ion bombardment. If the film and substrate are soluble, the heating of the surface of substrate 21 will additionally permit diffusion of the positive film ions into the substrate surface. The net effect is the deposition of a highly adherent film on the surface of substrate 21. The evaporation rate is dependent not only upon the character of the film material but also upon that of the substrate material. Optimum deposition conditions can be said to be governed by the ease with which the material of the film is sputtered and the substrate temperature rise which can be tolerated. Gold, for instance, is sputtered very easily so that if it is desired to use a slow evaporation rate (about 10,000 angstroms per minute) with a low substrate temperature rise (100° C. or less) it is correspondingly necessary to use low gas pressure (e.g., 10 microns of argon) with low current density (about one-tenth milliamp per square centimeter). If, however, one uses high evaporation rates (about 100,000 angstroms per minute) one can increase gas pressure to about 50 microns and have high current density (about five-tenths milliamp per square centimeter) and attain the same deposit thickness in less time.

Aluminum, on the other hand, is difficult to sputter. Therefore, one can use higher gas pressures of about 75 microns of argon with lower evaporation rates and higher cathode current densities. However, as indicated previously, the higher current densities will result in a greater substrate temperature rise. The advantage of the high current densities is to increase the ionization efficiency and the number of high energy ions striking the substrate surface.

In order to obtain a film by the method of this invention, it is clear that the deposition rate of particles of the film material must be higher than the rate at which they are sputtered by other particles striking substrate 21. Thus the highest practical accelerating potential should be used so that the greatest amount of surface modification with its attendant advantages will be obtained. Since the geometry of bell jar 10 and the type of gas are usually fixed, the normal variables are gas pressure and evaporation rate. That is, the pressure of the gas can be varied and the filament current can be varied. The higher gas pressures lead to higher current densities, higher sputtering rates and a greater substrate temperature rise. The higher evaporation rates result in greater deposition rates.

If the method of this invention is employed with a metal-to-metal or metal-to-semiconductor film substrate couple, it will be unnecessary to interpose grid 48 in front of substrate 21. If, however, the substrate 21 is an insulator a surface charge tends to build up which reduces the effect of the deposited ionized particles. The structure of grid 48, for example, allows a field-free region to be formed between grid 48 and substrate 21. In this field-free region electrons originating from secondary or thermionic emission will neutralize any surface charge buildup on substrate 21. Most of the accelerated ions will pass through grid 48 and impinge on substrate 21.

As an alternative to grid 48 for nonconductive substates, after the expiration of the cleaning period filament 26 may be heated by filament power supply 22 until a very small amount of film material (a few angstroms) is evaporated and deposited on substrate 21. Thereafter filament heat is substantially decreased and gas ion bombardment is continued for a further period. During this second period of film ion bombardment higher energy impacts of the substrate surface are made possible. This is because a conductive layer has been built up on the surface of substrate 21 (assuming the film material is metallic) and thus the surface charge problem is eliminated.

The cryogenic apparatus of FIG. 4 is particularly useful in performing the method of this invention in which the depositing material may have a very high vapor pressure and hence it is necessary to maintain the surface of substrate 52 below some fixed maximum temperature. Also, where significant rise in bulk temperature of substrate 52 can result in undesirable phase changes, the FIG. 4 apparatus is extremely desirable. In all other respects the process as described above may be practiced in the same manner as above described.

A particular area in which this invention finds utility is that of developing film substrate couples in which the two materials are essentially nonsoluble such as, for example, Ag-Fe, Cu-Mo, Ag-Ni, Ag-Mo, Au-Mo, Ni-Pb, and Ag-W. No diffusion occurs at the interface between such nonsoluble couples. However, bombardment of the surface of substrate 21 by high energy film ions will continue to produce a high concentration of surface defects which act as nucleation sites. All of the nonsoluble couples which have been deposited by the technique of this invention have been found strongly adhesive under the most rigorous testing methods while prior art methods have been found of extremely poor adherence, rarely passing even the grossest test.

A modified form of the technique discussed herein involves the introduction within bell jar 10 of a mixture of inert gas together with some reactive gas combined chemically with the ions of evaporated material of filament 26 at the surface of substrate 21 to furnish a compound film on said surface.

Quantitative tests of the adhesive qualities of a film substrate couple are not readily available. However, the results obtained by means of the invention described herein have been attested to by the application of well known adhesion tests of varying degrees of severity ranging from the tape test and ultrasonic agitation tests to the knife and scratch tests. In all such tests highly successful results have been achieved.

Some specific examples illustrating the practice of this invention to form specific film substrate couples are listed below.

(1) *Aluminum on iron.*—In the deposition of aluminum on iron, the iron is cleaned in dilute nitric acid, placed in the substrate holder and the system is evacuated to $10^{-5}$ torr. The system is then backfilled with argon to a gas pressure sufficient to give a gas discharge at 5,000 volts and 0.5 ma./cm.$^2$ cathode current density. The substrate is cleaned by ion bombardment for 30 minutes under these conditions. At the end of this period, the aluminum evaporation is begun from a tungsten filament positioned 6 inches from the cathode. The evaporation rate is maintained at 10 milligrams/sec. for 3 minutes giving a resultant film thickness of 0.1 mil.

(2) *Gold on silicon.*—In the deposition of gold on silicon, the silicon is prepared by mechanical polishing before being placed in the plating system. The cleaning time, gas discharge parameters and geometry are the same as for the deposition of aluminum on iron. Since gold sputters more easily than aluminum, a higher evaporation rate is necessary and an evaporation rate of 25 milligrams/sec. for 3 minutes from a tungsten boat gives a resulting film thickness of 0.1 mil.

(3) *Titanium on high alumina ceramics.*—In the deposition of titanium on ceramics, gross contaminants are first removed from the ceramic with solvents. The ceramics are then placed in a holder which masks all portions of the ceramic which are not to be coated. The cleaning time, gas discharge parameters and geometry are the same as for the preceding cases. The titanium evaporation source consists of titanium wire stranded with tungsten wire. At the completion of the cleaning time, the titanium source is heated until a small amount of titanium (film thickness less than 1000 Angstroms) is evaporated (ordinarily about 10 seconds by visual inspection) and deposited on the ceramic. The source heat is then substantially decreased, and the ion bombardment is continued for 5 minutes. At the end of this period, the evaporation is completed at a rate of 1 milligram/sec. for 1 minute giving a film thickness of 0.01 mil.

(4) *Aluminum oxide on copper.*—In the deposition of aluminum oxide on copper the same cleaning time, discharge parameters and geometry are used as in the previous cases. The reactive gas used, in this case, oxygen, is introduced along with argon. A 10% oxygen-90% argon mixture is used and is commercially available in tank form. An evaporation rate of 10 milligrams/sec. for 1 minute gives an aluminum oxide film of 0.01 mil in thickness.

The embodiments of FIGURES 4 and 5 comprise apparatus for utilizing a depositant, such as tungsten, in the form of a gas or a gaseous compound, such as tungsten hexachloride. Tungsten is a rather difficult metal to use as a depositant, and it would be especially difficult to use in the apparatus of FIG. 1 because of its high melting point. It does not appear practical to evaporate it in a crucible or on a filament because the crucible or filament melting point may be lower than or equal to that of the tungsten. Although the crucible or filament may be a compound or alloy with a higher melting point than the tungsten depositant the problem of the amount of heat required to evaporate the tungsten appears to be a practical limitation. Thus the use of a gas, such as tungsten hexachloride, in the apparatus shown in FIGURES 5 and 6 circumvents the heat problem. Another advantage is that the grain growth of the tungsten on the substrate is random rather than columnar, and the strength of the deposited metal is thus much greater. Another advantage of using the embodiments of FIGURES 5 and 6 is that a mandrel of virtually any configuration may be used as a substrate. Upon completion of the deposition process the mandrel may be dissolved, leaving a solid tungsten form.

In FIG. 5 is shown a bell jar 10 which may be sealingly affixed to a grounded metal baseplate 12. High voltage lead 15 may extend from high voltage D.-C. power supply 13 through sliding vacuum seal 18, grounded tubing 17, and high voltage feedthrough 19, to a substrate holder assembly (not shown in detail) and a substrate 70, which may be of any desired configuration. The bell jar may be evacuated as previously described through valved line 28.

Gas supply lines 72, 74, and 76, each of which may contain a valve and a flowmeter, may be connected to a gas inlet line 78. The line 78 may in turn be secured to a conductive cylinder 80 which may extend through baseplate 12 and into the bell jar. The substrate 70, as in the previous embodiments, may be the cathode and thus may have a negative bias applied thereto from high voltage power supply 13 and the cylinder 80 may comprise the anode of the high voltage bias supply. A conductor may extend from power supply 13 to inlet line 78 to complete the circuit to the cylinder. The cylinder may be insulated from the baseplate 18 by an appropriate glass or ceramic seal 82.

A porous diffuser plug 84, which may be of tungsten, may be inserted in the top of the conductive diffusing cylinder 80 and may serve simply to diffuse the gases entering the bell jar from inlet line 78 and cylinder 80.

An inert gas, such as argon, may be supplied through supply line 72 for cleaning purposes as previously discussed. That is, the bell jar may be evacuated through conduit 28 and a predetermined pressure of argon may be added. A gas or glow discharge may then be established to clean the mandrel or substrate 70.

Upon completion of the cleaning process the bell jar may again be evacuated through line 28 and an appropriate gas, such as tungsten hexachloride, may be introduced through gas supply line 74 and a reactive gas, such as hydrogen, may be introduced through gas supply line 76. The flowmeters and valves in the respective lines may allow adjustment of the proper volume ratio for the gases. For hydrogen and tungsten hexachloride the desired ratio may be 7 volumes hydrogen to 1 volume tungsten hexachloride. If desired, cleaning could be accomplished using the hydrogen rather than the argon as previously described.

The tungsten hexachloride and hydrogen react to produce tungsten and hydrogen chloride. Thus the source of deposited atoms is from a gas rather than from a metal which must be evaporated. Moreover, any reactive gas, such as oxygen, nitrogen, or a hydrocarbon, may be used to form the tungsten compounds.

Upon reaching the desired gas pressure within the bell jar, which pressure may consist of the combined pressures of the hydrogen, the tungsten hexachloride, the derivatives or reaction products of the two gases, and any residual argon, a glow discharge 32, separated from the substrate or mandrel 70 by a cathode dark space 31, may be established through the breakdown of the hydrogen and tungsten hexachloride gases.

The embodiment of FIGURE 6 is similar to that of FIGURE 5 except that a glass cylinder is used rather than a bell jar. The glass cylinder 100 may have sealingly affixed thereto conductive baseplates 102 and 104. Vacuum line 28 may extend through upper baseplate 104. Baseplates 102 and 104 and tubing 17 may be grounded as in the previous embodiments. A cylindrical shield 106 may be secured to baseplate 104 and may extend into the cylinder 100 to partially shield tubing 17 and high voltage feedthrough 19 to prevent ion bombardment and contamination of the high voltage insulator. In order to function for its designated purpose, the cylinder 106 should be radially spaced less than a cathode dark space distance from the components it is intended to shield. The function of the apparatus with respect to the cleaning and deposition process is substantially the same as that given for the embodiment of FIGURE 5.

Thus it may be seen that the apparatus and process described herein provides for the deposition of a superior metallic film on a substrate. The process enjoys such versatility that the depositant may be either a solid metal or a gaseous compound and that both forms of depositant, by the method and apparatus described, provide results heretofore unattainable.

I claim:

1. Apparatus for producing a metallic film at a rate of at least about ten thousand angstroms per minute on a substrate comprising in combination: an evacuable chamber; a baseplate for supporting said chamber; means for evacuating said chamber; means for admitting an ionizable gas within the chamber; cathode electrode means for supporting a substrate within the chamber so that the substrate is substantially at the same potential as said cathode; a D.C. circuit having grounded shield means proximate to said cathode, including within the chamber said cathode electrode means and an anode; said cathode electrode means and anode spaced apart a predetermined distance greater than the width of a cathode dark space for a glow discharge, said space being free of electrodes axially interposed between said anode and cathode and including means for establishing a glow discharge between said anode and said cathode electrode, means for ionizing said ionizable gas for cleaning said substrate; means integral with said anode for providing atoms of a depositant material within said chamber to be ionized by said glow discharge and subsequently accelerated by the potential difference toward said cathode and the substrate supported thereon whereby a film of depositant material is deposited to a desired thickness on said substrate.

2. The apparatus of claim 1 in which the D.-C. circuit includes a high voltage feedthrough which comprises a lead electrically connected to the substrate holding means, said lead including an insulated portion and an uninsulated portion extending from the termination of the insulation to the substrate holding means, said grounded shield means having a grounded cylindrical shield surrounding said lead, including a portion of the insulated portion, the uninsulated portion, and a portion of the substrate holding means, and spaced radially therefrom a distance less than the width of a cathode dark space within the chamber, grounded tubing concentrically disposed intermediate said insulated lead and said shield and extending within said shield a distance less than the length of the insulated portion of the lead, a metallic guide disposed within said shield between said tubing and said shield, and insulating means concentrically disposed about the lead and extending from the termination of the insulation to the substrate holding means for insulating the shield from the lead.

3. The apparatus of claim 2 in which the means for providing atoms of depositant includes a filament adapted to hold solid depositant material and to evaporate such material.

4. The apparatus of claim 3 in which the means for supporting a substrate within the chamber includes a cold finger for cooling the substrate.

5. The apparatus of claim 2 in which the means for providing atoms of depositant material within the chamber includes a cylinder insulated from and secured to said baseplate and extending into said chamber, a gas inlet line connected to said cylinder for providing said cylinder with a desired gaseous medium, and a porous plug connected to the cylinder for diffusing the gaseous medium within the chamber.

6. The apparatus of claim 5 in which the evacuable chamber comprises a cylinder having a second baseplate sealingly affixed thereto, and the means for evacuating the chamber, the cathode, and the substrate holding means extend through the second baseplate.

7. The apparatus of claim 6 which includes a cylindrical shield affixed to the second baseplate extending into the chamber and concentrically disposed about the cathode and the high voltage feedthrough.

8. The apparatus of claim 1 wherein there is provided a high voltage feedthrough device comprising said grounded shield means including an outer cylindrical ground shield surrounding an insulated high voltage lead adjacent the connection of said lead to said negative electrode, said outer ground shield being separated from said lead by a metallic shield at a radial distance length less than the width of the cathode dark space within said chamber and said outer ground shield being separated from said negative electrode by a distance greater than the width of said cathode dark space, and means whereby said ground shield may be electrically isolated from said high voltage lead.

References Cited
UNITED STATES PATENTS

| | | | |
|---|---|---|---|
| 1,644,350 | 10/1927 | Palmer | 204—192 |
| 1,710,747 | 4/1929 | Smith | 204—192 |
| 1,866,729 | 7/1932 | Spanner et al. | 204—192 |
| 2,960,457 | 11/1960 | Kuhlman | 204—192 |
| 3,021,271 | 2/1962 | Wehner | 204—192 |
| 3,267,015 | 8/1966 | Morley | 204—192 |

FOREIGN PATENTS

| | | |
|---|---|---|
| 567,633 | 12/1958 | Canada. |

JOHN H. MACK, *Primary Examiner.*

R. K. MIHALEK, *Assistant Examiner.*